(12) United States Patent  (10) Patent No.: US 11,997,348 B2
Benjamin et al.  (45) Date of Patent: *May 28, 2024

(54) CONTENT VERSIONING SYSTEM

(71) Applicant: Spooler Media, Inc., Bend, OR (US)

(72) Inventors: Daniel Benjamin, Austin, TX (US); Henry Blodget, Brooklyn, NY (US); James O. Boggs, Bend, OR (US); Andrew Bowers, Santa Barbara, CA (US); Kerry Donahue, New York, NY (US)

(73) Assignee: Spooler Media, Inc., Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,965

(22) Filed: Sep. 19, 2022

(65) Prior Publication Data
US 2023/0308714 A1 Sep. 28, 2023

Related U.S. Application Data

(63) Continuation of application No. 17/683,038, filed on Feb. 28, 2022, now Pat. No. 11,451,863.

(51) Int. Cl.
G11B 27/00 (2006.01)
H04L 67/50 (2022.01)
H04N 5/93 (2006.01)
H04N 5/94 (2006.01)
H04N 21/439 (2011.01)
H04N 21/84 (2011.01)
H04N 21/845 (2011.01)
H04N 9/88 (2006.01)

(52) U.S. Cl.
CPC ....... *H04N 21/4394* (2013.01); *H04L 67/535* (2022.05); *H04N 21/8402* (2013.01); *H04N 21/845* (2013.01)

(58) Field of Classification Search
CPC . G11B 27/00; H04N 5/93; H04N 5/94; H04N 9/88
USPC ................ 386/278, 241, 239, 248, 282, 280
See application file for complete search history.

(56) References Cited

U.S. PATENT DOCUMENTS

2003/0084442 A1* 5/2003 Kellner .................. H04N 5/607 725/38
2007/0282472 A1* 12/2007 Seldman .............. G11B 27/322 700/94

(Continued)

*Primary Examiner* — Daquan Zhao
(74) *Attorney, Agent, or Firm* — Pillsbury Winthrop Shaw Pittman, LLP

(57) ABSTRACT

Provided is a method including providing a first audio content object that includes a plurality of audio content segments to a set of user computing devices. Each audio content segment of the plurality of audio content segments is associated with a first version. The method also includes obtaining a second version of a first audio content segment and updating the first version of the first audio content segment to the second version to generate a second audio content object that includes the second version of the first audio content segment and at least a first version of a second audio content segment. The method also includes providing the second audio content object to at least a first portion of the set of user computing devices and indicating a version history of the first audio content segment to at least the first portion of the set of user computing devices.

108 Claims, 8 Drawing Sheets

(56) References Cited

U.S. PATENT DOCUMENTS

| | | | |
|---|---|---|---|
| 2009/0019216 A1* | 1/2009 | Yamada | G06F 3/0625 |
| | | | 711/E12.001 |
| 2018/0189369 A1* | 7/2018 | Baek | G06F 40/197 |
| 2019/0259424 A1* | 8/2019 | Lintz | G11B 27/005 |

* cited by examiner

CONTENT VERSIONING SYSTEM

CROSS REFERENCE TO RELATED APPLICATIONS

This patent application is a continuation of U.S. patent application Ser. No. 17/683,038 filed 28 Feb. 2022, titled "CONTENT VERSIONING SYSTEM." The entire content of each afore-mentioned patent filing is hereby incorporated by reference.

BACKGROUND

1. Field

The present disclosure relates generally to computer-implemented system and method for content versioning.

2. Description of the Related Art

Internet distribution of media content, such as audio content, video content, visual content, audio video content, or other media content, continues to increase every year. For example, studies have reported a 300% increase in podcast consumption over the previous decade, with over 40% of the U.S. population reporting to have listened to a podcast in the past month. And numerous video streaming and local caching services have disrupted conventional cable, satellite, and movie businesses. Also, more and more people are receiving news and information from the Internet via their smartphones and computers. Even conventional conduits of media content, such as televisions, may receive media content through the Internet that is provided on-demand or cached locally in advance for the user.

SUMMARY

The following is a non-exhaustive listing of some aspects of the present techniques. These and other aspects are described in the following disclosure.

Some aspects include a method including providing, using a computer system, a first audio content object that includes a plurality of audio content segments to a set of user computing devices, wherein each audio content segment of the plurality of audio content segments is associated with a first version of that audio content segment; obtaining, using the computer system, a second version of a first audio content segment included in the plurality of audio content segments; updating, using the computer system, the first version of the first audio content segment to the second version to generate a second audio content object from the first audio content object that includes the second version of the first audio content segment and at least a first version of a second audio content segment included in the plurality of audio content segments; providing, using the computer system, the second audio content object to at least a first portion of the set of user computing devices; and indicating, using the computer system, a version history of the first audio content segment to at least the first portion of the set of user computing devices.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
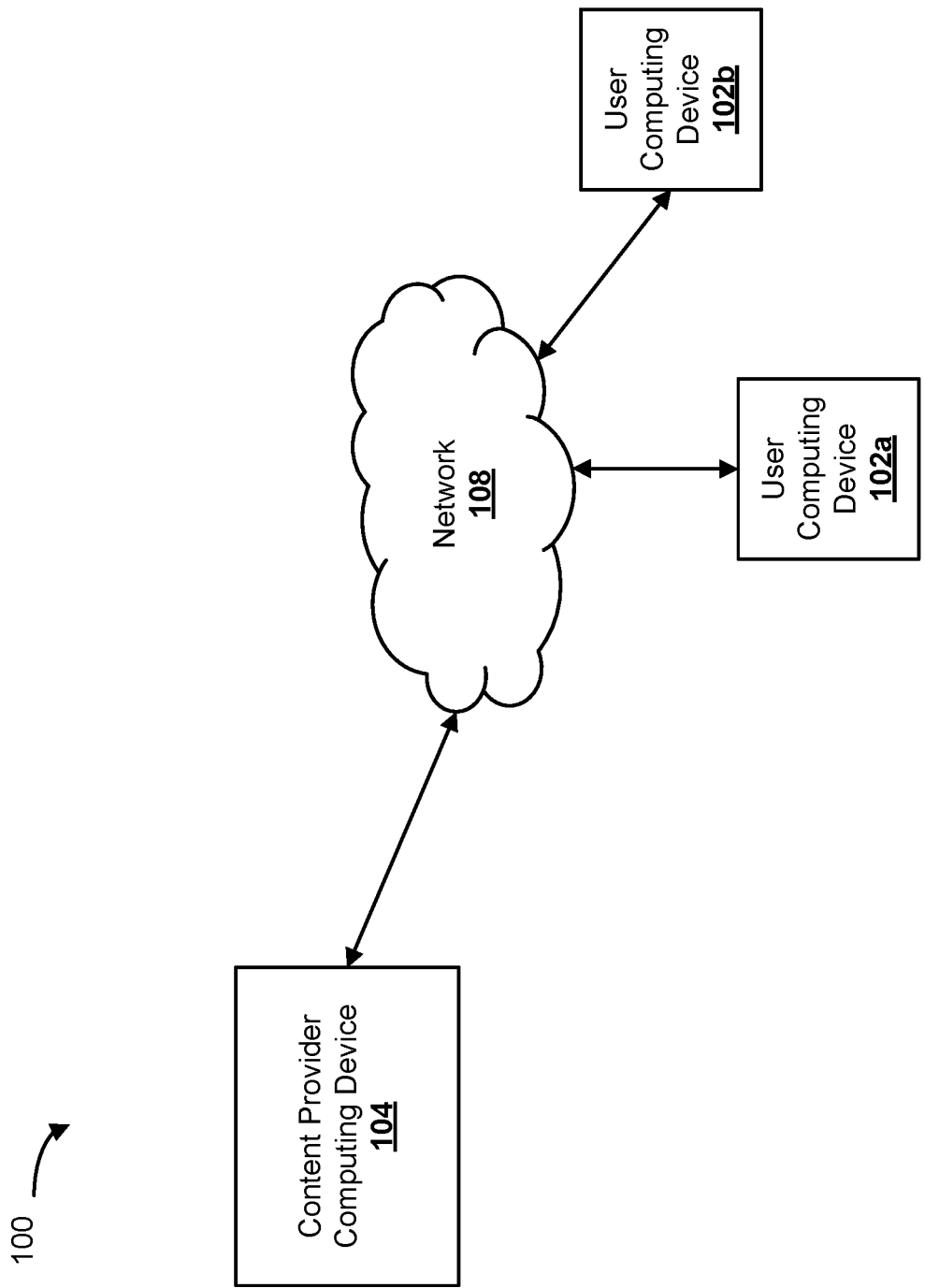
FIG. 1 is a block diagram illustrating an example of a media content versioning system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of digital content-creation tooling, data compression, and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

, For Internet-based media content providers, managing and distributing digital media content may be difficult. For example, evolving media content (media content that periodically changes (e.g., news)) may be difficult to track and provide updates to the developing story. Also, this content may be manipulated or faked deliberately or by accident when editing the content which results in different context than what the original author intended. More specifically, many machine learning approaches to detecting deep fakes suffer from adversarial attacks. Furthermore, segmenting and composing digital content interferes with many compression algorithms near the boundary of segments and normalization algorithms' performance near the boundary. That said, embodiments are not limited to systems that address all of these problems, as various independently useful inventive techniques are described herein, and some embodiments may address only a subset of these problems or other problems that would be evident to one of ordinary skill in the art reading the present disclosure, none of which is to suggest that any other description is limiting.

Some embodiments provide a media content versioning system. Some embodiments may provide tools for a media content administrator to generate and manage versioning of portions of a media content object (a term which should not be read to suggest that the present techniques are limited to object-oriented programming languages, as other types of data structures can also serve as objects in the present sense). The media content object may include a plurality of media content segments. In some cases, the same object may evolve over time, such that different segments change versions while others remain static, while still being referred to as the same object (e.g., reference to "an object" followed by reference to "the object" does not preclude a new version of a segment being present in the subsequent reference). The media content segments may be selected from a media content segment library or generated in real time and, as such, be used in a plurality of media content objects. The resulting media content object may be provided to a user at a user computing device for consumption, which the user may consume, partially consume or not consume the media content object. Each media content segment may be associated with a version and version information. The version and the version information may be provided to the user's computing device when the media content object is provided to the user's computing device via a network. A micropayment system may be associated with the media content segments included in the media content segment library. A creator of a media content segment may receive a monetary payment for the use of the media content segment in a media content segment or each time that the media content segment is consumed. In some embodiments, each of the segments in a track may undergo a version change and the system may perform a method of media versioning that is described in application number 63/314,952 titled AUTOMATIC MEDIA CONTENT LAYERING SYSTEM, and filed Feb. 28, 2022, which is incorporated by reference in its entirety.

Subsequently, a media content segment may be updated from a first version to a second version. Instead of having to manually replace the first version of the media content segment in each media content object, some embodiments may update all media content objects that include the first version of the media content segment to now include the second version of the media content segment. The media content versioning system may then provide a media content object that includes the second version of the media content segment to a user via the network for consumption by the user at a user computing device associated with the user. A graphical user interface (e.g., instructions by which a user's computing device at least in part renders such a GUI, which may be non-executable data upon which the GUI is based) may be provided with the media content object that includes the version history of the media content segment. In various embodiments, every change to a media content segment results in the creation of a new media content object of media content objects that include the prior version of the media content segment. In other words, a new media content object may be generated for every playlist that includes the old version of the media content object that is now updated to the new version of the media content object. Each playlist may be linked to the media content segment and the system, unless otherwise declared, presents the newest version of that media content segment to each media content object and its playlist. In situations where, the media content object is a podcast, the user may download the new podcast. However, in other embodiments, the application may include instructions to inject the media content object with the new *medica* content segment replacing the old media content segment at the user device.

In some embodiments, the media content versioning system may create an abridged second version of the media content segment based on the second version of the media content segment and the first version of the media content segment. For example, the abridged second version may include material that is new to the second version of the media content segment while material that was included in the first version of the media content segment may be removed from the second version of the media content segment and not included in the abridged second version. In some embodiments, the abridged second version may be provided in media content objects that are provided to users that have consumed the first version of the media content object while media content objects that include the second version of the media content segment may be provided to users that have not consumed the first version of the media content object. In other embodiments, the abridged second version may be created based on user preferences or other rules defined by the user and may include additions and subtractions to the media content.

In either case, the versioning may be tracked and displayed (e.g., visually or via audio) to the user by the user's computing device, so the user can better consume the content of an evolving story while not disrupting the other media content segments in the media content object. The user may be provided the versioning history of the media content segment as well as access to earlier versions so that the user can better verify the underlying subject matter of the media content segment.

FIG. 1 depicts a block diagram of an example of a media content versioning system 100, consistent with some embodiments. In some embodiments, the media content versioning system 100 may include one or more user computing devices (e.g., a user computing device 102*a* and a user computing device 102*b*) and a content provider computing device 104. The user computing devices 102*a* and 102*b* and the content provider computing device 104 may be in communication with each other over a network 108. In various embodiments, the user computing device 102*a* may be associated with a first user and the user computing device 102*b* may be associated with a second user (e.g., in memory of the media content versioning system 100 in virtue of user profiles). These various components may be implemented with computing devices like that shown in FIG. 6.

In some embodiments, the user computing devices 102*a* and 102*b* may be implemented using various combinations of hardware or software configured for wired or wireless communication over the network 108. For example, the user computing devices 102a and 102b may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HMD), a watch, an eyeglass projection screen, an autonomous/semi-autonomous device, a vehicle, a user badge, or other user computing devices. In some embodiments, the user computing devices 102a and 102b may include various combinations of hardware or software having one or more processors and capable of reading instructions stored on a tangible non-transitory machine-readable medium for execution by the one or more processors. Consistent with some embodiments, the user computing devices 102a and 102b include a machine-readable medium, such as a memory that includes instructions for execution by one or more processors for causing the user computing devices 102a and 102b to perform specific tasks. In some embodiments, the instructions may be executed by the one or more processors in response to interaction by the user. Two user computing devices are shown, but commercial implementations are expected to include more than one million, e.g., more than 10 million, geographically distributed over North America or the world.

The user computing devices 102a and 102b may include a communication system having one or more transceivers to communicate with other user computing devices or the content provider computing device 104. Accordingly and as disclosed in further detail below, the user computing devices 102a and 102b may be in communication with systems directly or indirectly. As used herein, the phrase "in communication," and variants thereof, is not limited to direct communication or continuous communication and can include indirect communication through one or more intermediary components or selective communication at periodic or aperiodic intervals, as well as one-time events.

For example, the user computing devices 102a and 102b in the media content versioning system 100 of FIG. 1 may include first (e.g., relatively long-range) transceiver to permit the user computing devices 102a and 102b to communicate with the network 108 via a communication channel. In various embodiments, the network 108 may be implemented as a single network or a combination of multiple networks. For example, in various embodiments, the network 108 may include the Internet or one or more intranets, landline networks, wireless networks, or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network or any subsequent generations. In some examples, the network 108 may be additionally or alternatively be implemented by a variety of communication networks, such as, but not limited to (which is not to suggest that other lists are limiting), a satellite communication network, a microwave radio network, or other communication networks.

The user computing devices 102a and 102b additionally may include second (e.g., short-range relative to the range of the first transceiver) transceiver to permit the user computing device 102a and 102b to communicate with each other or other user computing devices via a direct communication channel. Such second transceivers may be implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceivers, and other transceivers that are configured to allow the user computing devices 102a and 102b to communicate with each other or other user computing devices via an ad-hoc or other wireless network.

The media content versioning system 100 may also include or may be in connection with the content provider computing device 104. For example, the content provider computing device 104 may include one or more server devices, storage systems, cloud computing systems, or other computing devices (e.g., desktop computing device, laptop/notebook computing device, tablet computing device, mobile phone, etc.). In various embodiments, content provider computing device 104 may also include various combinations of hardware or software having one or more processors and capable of reading instructions stored on a tangible non-transitory machine-readable medium for execution by the one or more processors. Consistent with some embodiments, the content provider computing device 104 includes a machine-readable medium, such as a memory (not shown) that includes instructions for execution by one or more processors (not shown) for causing the content provider computing device 104 to perform specific tasks. In some embodiments, the instructions may be executed by the one or more processors in response to interaction by the user. The content provider computing device 104 may also be maintained by an entity with which sensitive credentials and information may be exchanged with the user computing devices 102a and 102b. The content provider computing device 104 may further be one or more servers that hosts applications for the user computing devices 102a and 102b. The content provider computing device 104 may be more generally a web site, an online content manager, a service provider, or other entity who provides media content (e.g., video content, audio content, visual content, text content, audiovisual content, haptic content, or any other media content that would be apparent to one of skill in the art in possession of the present disclosure) or services to the user. The content provider computing device 104 may include various applications and may also be in communication with one or more external databases, that may provide additional information that may be used by the content provider computing device 104.

Figure 2:
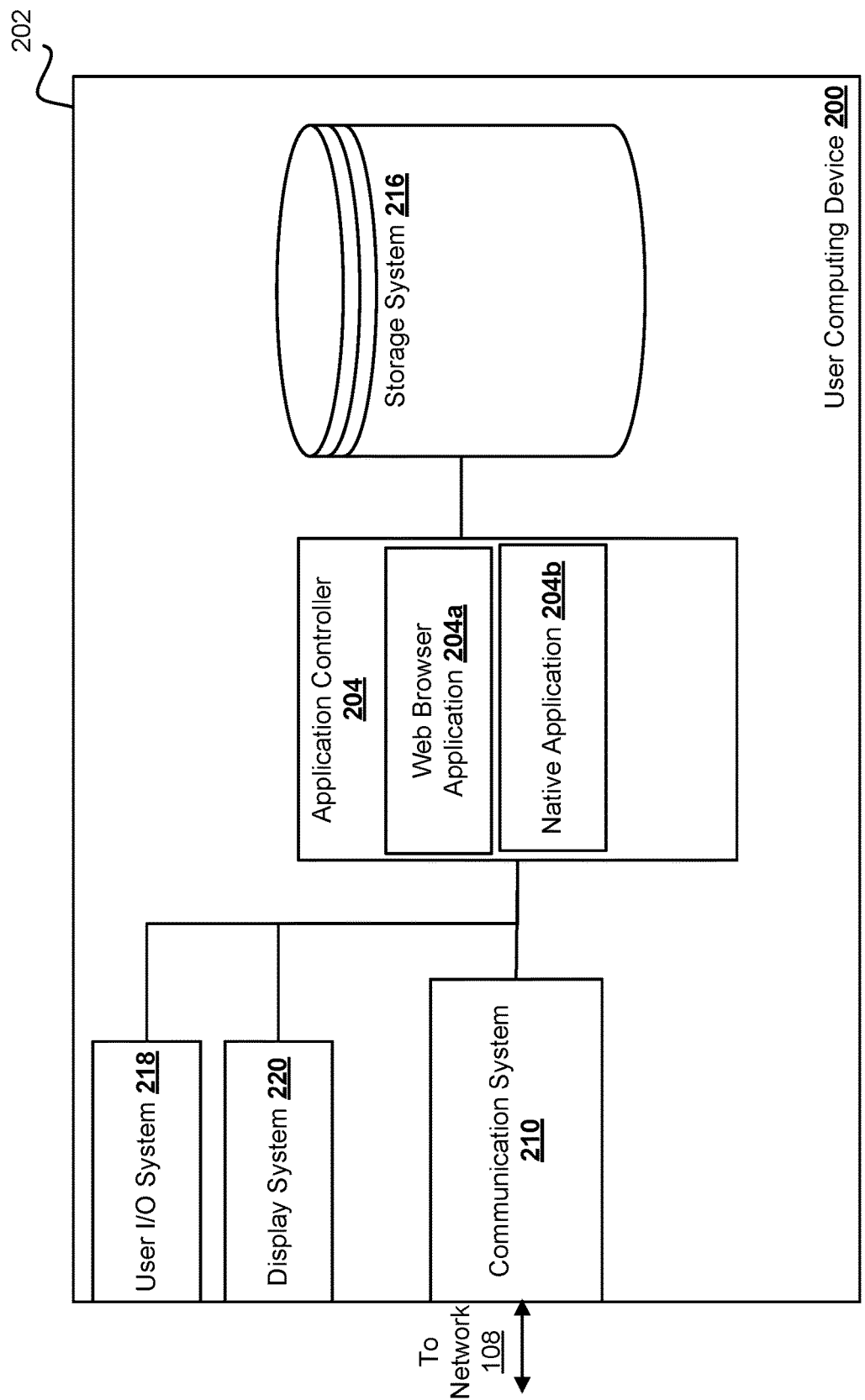
FIG. 2 is a block diagram illustrating an example of a user computing device of the media content versioning system of FIG. 1, in accordance with some embodiments of the present disclosure.

FIG. 2 illustrates an embodiment of a user computing device 200 that may be the user computing device 102a or 102b discussed above with reference to FIG. 1. In the illustrated embodiment, the user computing device 200 includes a chassis 202 that houses the components of the user computing device 200. Several of these components are illustrated in FIG. 2. For example, the chassis 202 may house a processing system and a non-transitory memory system that includes instructions that, when executed by the processing system, cause the processing system to provide an application controller 204 that is configured to perform the functions of the application controller or the user computing devices discussed below. In the specific example illustrated in FIG. 2, the application controller 204 is configured to provide one or more of a web browser application 204a or a native application 204b.

The chassis 202 may further house a communication system 210 that is coupled to the application controller 204 (e.g., via a coupling between the communication system 210 and the processing system). The communication system 210 may include software or instructions that are stored on a computer-readable medium and that allow the user computing device 200 to send and receive information through the communication networks discussed above. For example, the communication system 210 may include a communication interface to provide for communications through the network 108 as detailed above (e.g., first (e.g., long-range) transceiver). In an embodiment, the communication interface may include a wireless antenna that is configured to provide communications with IEEE 802.11 protocols (Wi-Fi), cellular communications, satellite communications, other microwave radio communications or communications. The communication system 210 may also include a communication interface (e.g., the second (e.g., short-range) transceiver) that is configured to provide direct communication with other user computing devices, sensors, storage devices, beacons, and other devices included in the securitization system discussed above with respect to FIG. 1. For example, the communication interface may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), or other wireless communication protocols that allow for direct communication between devices.

The chassis 202 may house a storage device (not illustrated) that provides a storage system 216 that is coupled to the application controller 204 through the processing system. The storage system 216 may be configured to store data, applications, or instructions described in further detail below and used to perform the functions described herein. In various embodiments, the chassis 202 also houses a user input/output (I/O) system 218 that is coupled to the application controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, or any other input subsystem. The chassis 202 also houses a display system 220 that is coupled to the application controller 204 (e.g., via a coupling between the processing system and the display system 220) and may be included in the user I/O system 218. In some embodiments, the display system 220 may be provided by a display device that is not integrated into the user computing device 200 and that includes a display screen (e.g., a display screen on a laptop/notebook computing device, a tablet computing device, a mobile phone, or wearable device), or by a display device that is coupled directly to the user computing device 200 (e.g., a display device coupled to a desktop computing device by a cabled or wireless connection).

Figure 3:
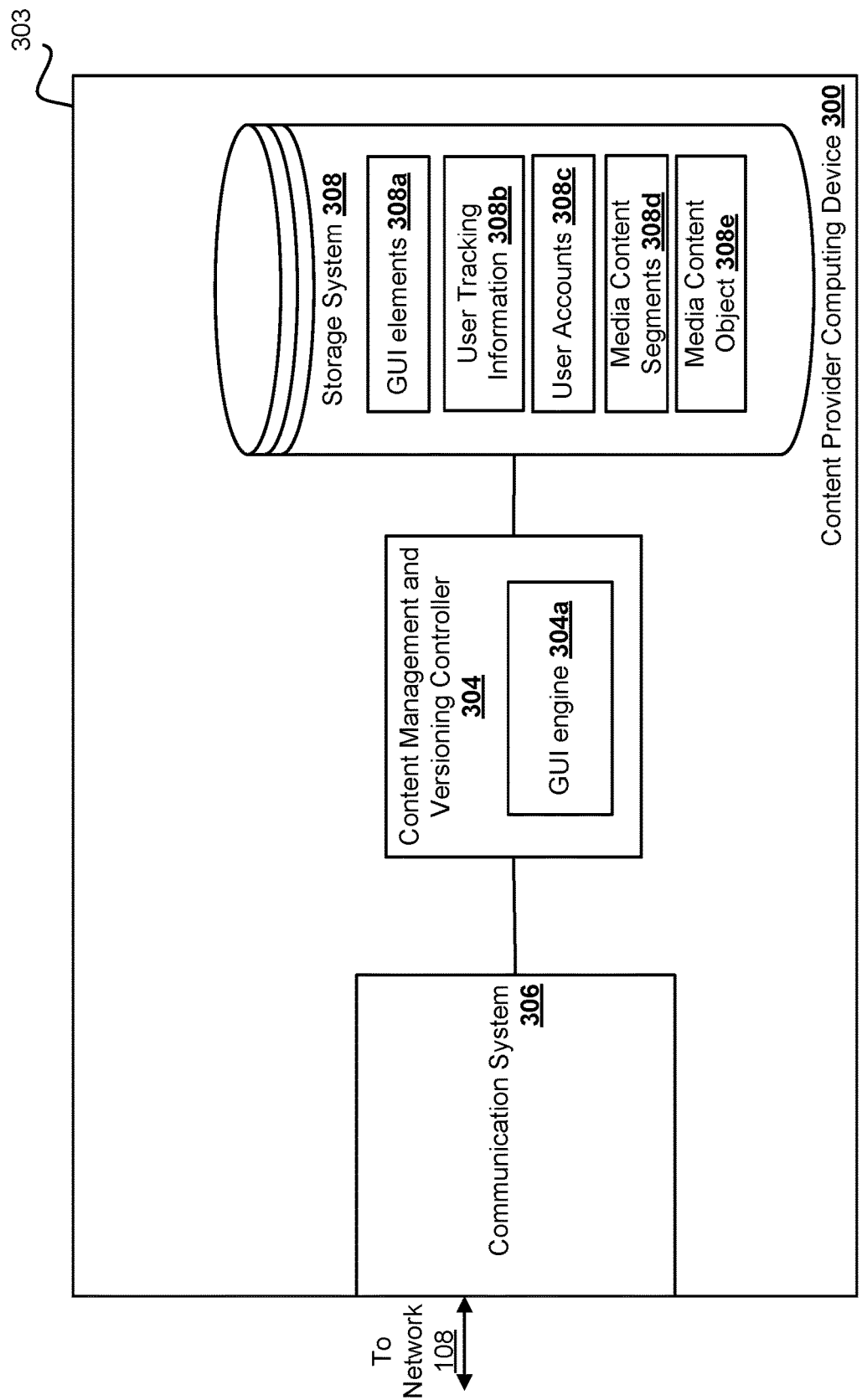
FIG. 3 is a block diagram illustrating an example of a service provider server computing device of the media versioning system of FIG. 1, in accordance with some embodiments of the present disclosure.

FIG. 3 depicts an embodiment of a content provider computing device 300, which may be the content provider computing device 104 discussed above with reference to FIG. 1. In the illustrated embodiment, the content provider computing device 300 includes a chassis 302 that houses the components of the content provider computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a content management and versioning controller 304 that is configured to perform the functions of the content management and versioning controller or service provider server devices discussed below. The content management and versioning controller 304 may include a graphical user interface (GUI) engine 304a used to generate GUIs and GUI elements discussed below.

The chassis 302 may further house a communication system 306 that is coupled to the content management and versioning controller 304 (e.g., via a coupling between the communication system 306 and the processing system) and that is configured to provide for communication through the network 108 of FIG. 1 as detailed below. The communication system 306 may allow the content provider computing device 300 to send and receive information over the network 108 of FIG. 1. The chassis 302 may also house a storage device (not illustrated) that provides a storage system 308 that is coupled to the content management and versioning controller 304 through the processing system. The storage system 308 may be configured to store GUI elements 308a, user tracking information 308b, user accounts 308c, media content segments 308d, media content object 308e or other data or instructions to complete the functionality discussed herein. In various embodiments, the storage system 308 may be provided on the content provider computing device 300 or on a database accessible via the communication system 306.

Figure 4:
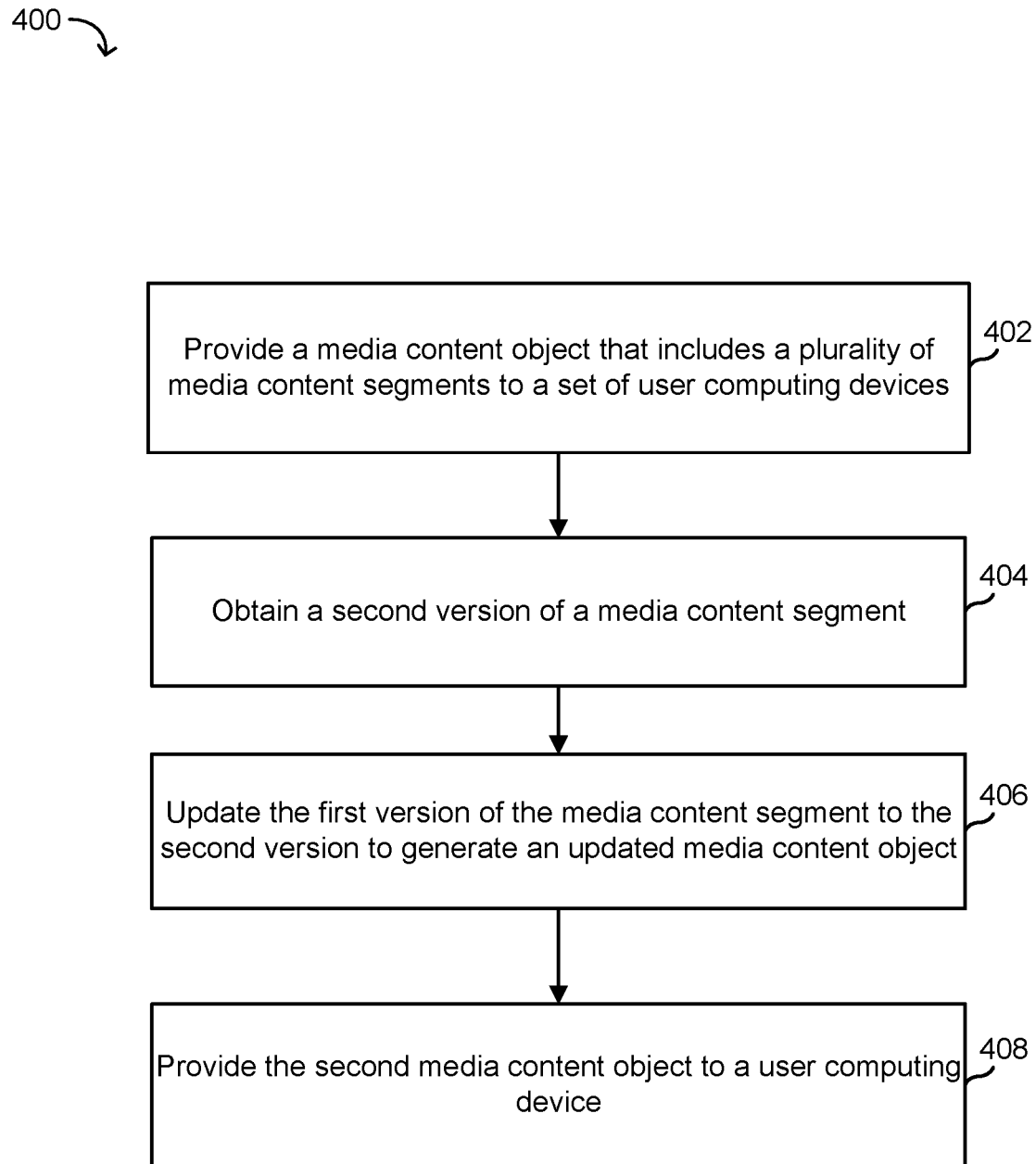
FIG. 4 is a flow diagram illustrating an example of a method of the media versioning system, in accordance with some embodiments of the present disclosure.

FIG. 4 depicts an embodiment of a method 400 of media content versioning, which in some embodiments may be implemented with the components of FIGS. 1, 2, and 3 discussed above. As discussed below, some embodiments make technological improvements to Internet-based media content platforms and GUIs used on those platforms. Some embodiments provide for verification and authentication of digital media content that is intermittently or periodically updating. The systems and methods also reduce memory, processing, and network resources by segmenting media content and providing updates to media content objects to only media content segments included in the media content object that have an updated version. A new version of the media content segment may be disseminated to each of the media content objects that include that media content segment that has experienced a version change without having to manually rebuild each media content object. One of skill in the art in possession of the present disclosure will recognize that these Internet-centric and digital content-based problems, along with other Internet-centric and digital content-based problems, are solved or mitigated by some of these embodiments. Again, though, embodiments are not limited to approaches that address these problems, as various other problems may be addressed by other aspects of the present disclosure, which is not to suggest that any other description is limiting.

The method 400 is described as being performed by the content management and versioning controller 304 included on the content provider computing device 104/300. The content management and versioning controller 304 may be included on a decentralized content distribution system, such as, but not limited to, BitTorrent, Filecoin or Storj. Furthermore, it is contemplated that the user computing device 200 may include some or all the functionality of the content management and versioning controller 304. As such, some or all of the steps of the method 400 may be performed by the user computing device 200 and still fall under the scope of the present disclosure. As mentioned above, the content provider computing device 104/300 may include one or more processors or one or more servers, and thus the method 400 may be distributed across the those one or more processors or the one or more servers.

The method 400 may begin at block 402 where a media content object that includes a plurality of media content segments is provided to a set of user computing devices. In some embodiments, at block 402, the content management and versioning controller 304 may obtain a media content object (also referred to herein as a media content edition interchangeably with object) from the media content objects 308e included in the storage system 308 and provide the media content object to a set of user computing devices (e.g., the user computing device 102a or the user computing device 102b). Each media content object may include at least one media content segment from the media content segments 308d. Each media content segment may be associated with a version of that media content segment (e.g., an initial/first version, a second version, a third version, a final version, or any other versioning convention). The media content segments included in the media content object may be ordered such that the media content segments play sequentially or in any other order (e.g., randomly using a random number generator). In one example, as a user listens through podcast player, the media content object (e.g., a podcast episode) may include a compiled MP3 file, however other audio standards are contemplated. The media content segments have been mastered together in a single playlist with all music, content, transitions, and ads included. The media content segments may have been of different media formats that have been converted into the desired format for the media content object and then concatenated into the media content object. The media content object may be streamed from a web player provided by the content management and versioning controller 304 or as a download that a user may download via the web browser application 204a or the native application 204b.

Prior to block 402, a media content administrator using, for example, the user computing device 102a may create and provide a plurality of media content segments to the content provider computing device 104/300 via the web browser application 204a or the native application 204b and the network 108. For example, the content management and versioning controller 304 may provide a website via the web browser application 204a or provide the native application 204b. The media content administrator may create, using software tools provided by the content management and versioning controller 304, a media content object that includes the one or more of the plurality of media content segments. For example, the content management and versioning controller 304 may generate a media content object GUI using the GUI engine 304a. The GUI engine 304a may generate or obtain GUI elements 308a that are based on media content segment information associated with the media content segment. The media content object GUI may be provided to the user computing device 102a via the network 108 and displayed on the display system 220 via the web browser application 204a and the native application 204b. The media content object GUI may include media content segment GUI elements for each media content segment. The media content administrator may add the media content segments to a media content object by selecting and moving (e.g., a drag and drop action) a media content segment GUI element into a media content object GUI element. One or more media content segment GUI elements may be added to the media content object GUI element. When provided in the media content object GUI element, the media content administrator may order the media content segment GUI elements in any order (e.g., by selecting and dragging the media content segment GUI elements in a desired position).

A resulting media content object may be generated from the defined media content object GUI elements. For example, media files that include the same codec may be concatenated by a demuxer that reads a list of files and other directives from a text file and demuxes them one after the other, as if all their packets had been muxed together. All files must have the same streams (same codecs, same time base, etc.) but can be wrapped in different container formats. Media files that include the same codec may also be concatenated using concat protocol. While the demuxer works at the stream level, the concat protocol works at the file level. Media files that do not include the same codec may be concatenated by a concat filter or using an external script.

Figure 5A:
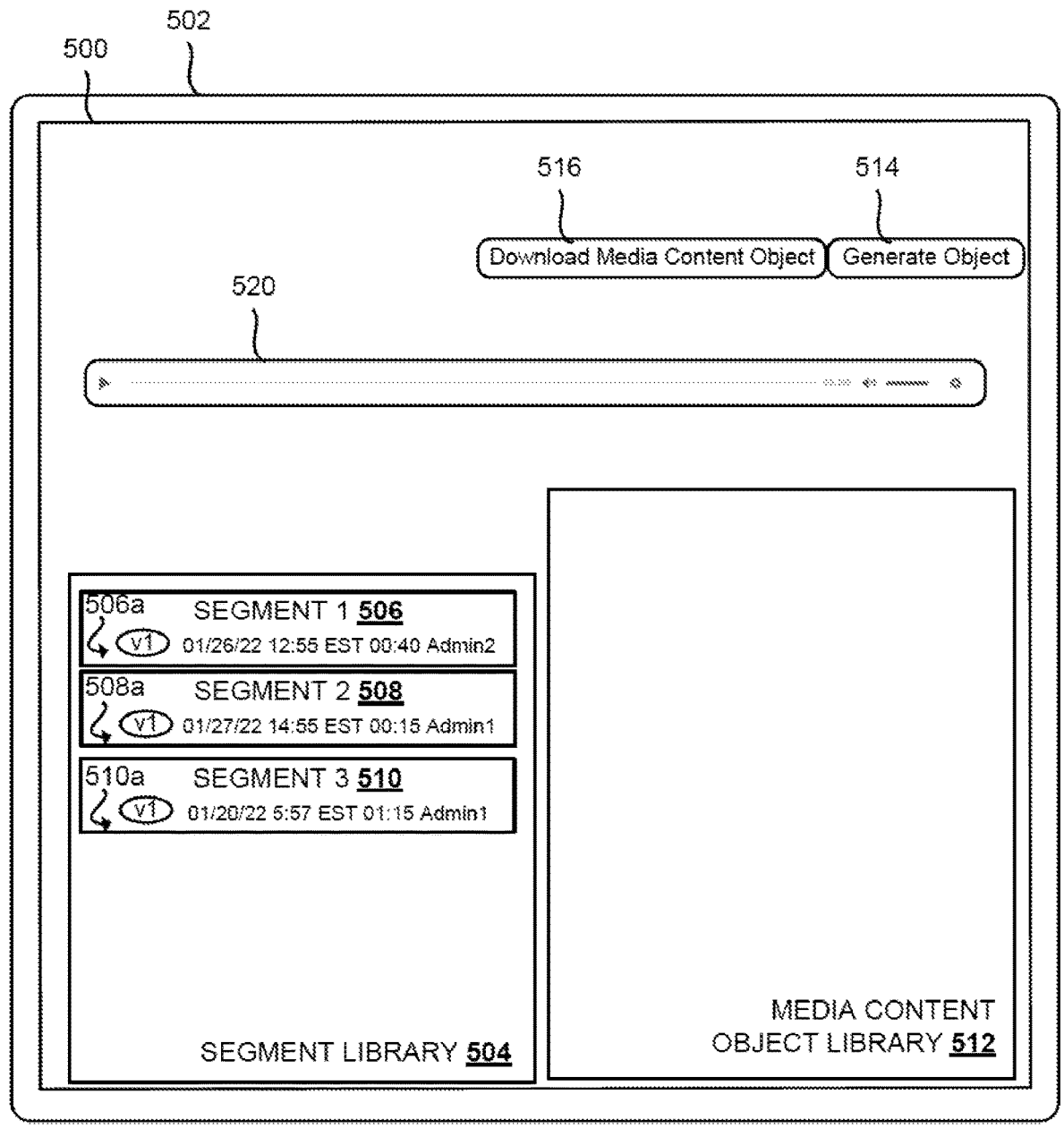
FIG. 5A illustrates a graphical user interface (GUI) during some embodiments of the method of FIG. 4, in accordance with some embodiments of the present disclosure.
Figure 5B:
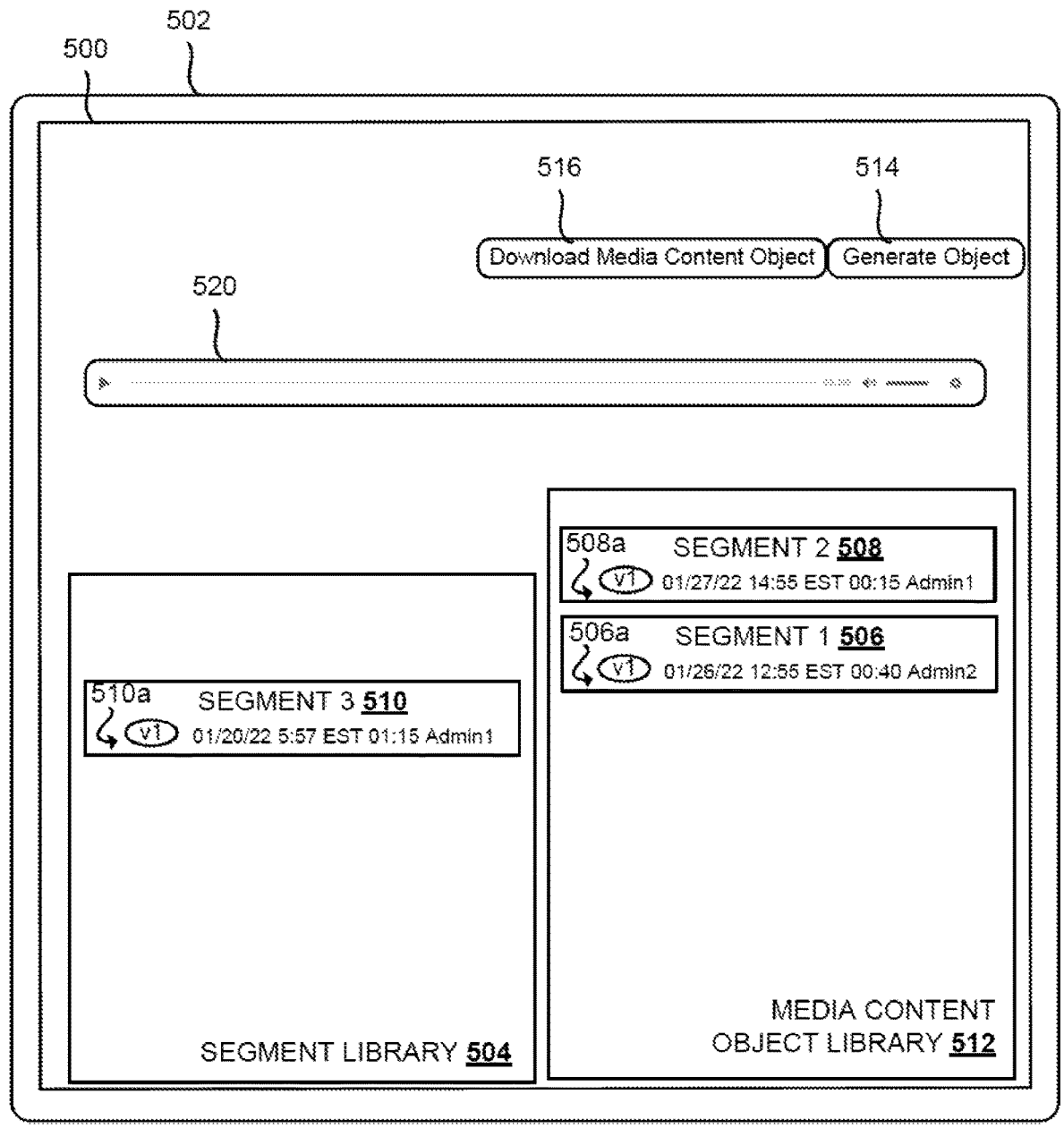
FIG. 5B illustrates a GUI during some embodiments of the method of FIG. 4, in accordance with some embodiments of the present disclosure.

FIGS. 5A and 5B illustrate a GUI 500 displayed on a display device 502 included in the display system 220 of FIG. 2. The GUI 500 may include a segment library 504 that includes one or more media content segment GUI elements such as media content segment GUI elements 506, 508 and 510. Each media content segment GUI elements 506, 508 and 510 may be associated with a respective media content segment and include media content segment information. For example, the media content segment GUI element 506 may include media content segment information 506a such as a version (e.g., "v1") of the media content segment, a version time stamp (e.g., "1/26/22 12:55 EST"), a version duration (e.g., "00:40"), and a version author (e.g., "Admin2"). Similarly, the media content segment GUI element 508 may include media content segment information 508a such as a version (e.g., "v1") of the media content segment, a version time stamp (e.g., "1/27/22 14:55 EST"), a version duration (e.g., "00:15"), and a version author (e.g., "Admin1"). Likewise, the media content segment GUI element 510 may include media content segment information 510a such as a version (e.g., "v1") of the media content segment, a version time stamp (e.g., "1/20/22 5:57 EST"), a version duration (e.g., "01:15"), and a version author (e.g., "Admin1"). While specific media content segment information is illustrated in each media content segment GUI element 506, 508, and 510, one of skill in the art in possession of the present disclosure will recognize that other media content segment/version information may be included.

Each of the media content segment GUI elements 506, 508, and 510 may be selectable and dropped into the media content object library 512. As illustrated between FIGS. 5A and 5B, the media content administrator may have selected the media content segment GUI elements 506 and 508 and moved the media content segment GUI elements 506 and 508 into the media content object library 512. The order of the media content segment GUI elements 506 and 508 with the media content segment GUI element 508 at the top of the media content object library 512 and the media content segment GUI element 506 below the media content segment GUI element 508 may dictate the order in which the media content segments corresponding with the media content segment GUI elements 506 and 508 are presented in the media content object (e.g., with the media content segment associated with the media content GUI element 508 being presented first).

When the media content administrator is satisfied with the media content segments selected for the media content object library 512 and the order of the media content segments, the administrator may select the generate object GUI element 514 to generate a media content object that includes the media content segments associated with the media content segment GUI elements 506 and 508. In some embodiments, the media content administrator may download the media content object by selecting the download media content object element 516.

While the media content object may be generated from the media content object GUI element, in other embodiments of the present disclosure, the media content administrator may generate, via the content management and versioning controller 304, media content object rules such that the content management and versioning controller 304 may create the media content object using the media content segments based on the media content object rules. These rules may be user specific such that rules consider user tracking information 308b or information from the user accounts 308c and media content segment information (e.g., topics, keywords, broadcaster identifier, or other information). As such, a personalized media content object may be generated for each user of the media content versioning system 100 using the media content segments 308d provided by media content administrator of the user computing device 102a or other media content segments that were provided by other media content administrators. Furthermore, each personalized media content object may have a different selection of the media content segments or a different ordering of the media content segments.

During block 402, the content management and versioning controller 304 may provide the media content object to one or more user computing devices. For example, the content management and versioning controller 304 may provide the media content object to the user computing device 102b that is associated with a user. The user may consume, partially consume (e.g., consume a portion of the media content segments), or not consume the media content object. In various embodiments, a user GUI may be generated that corresponds with the media content object. The user GUI may indicate a version history for each media content segment of the media content object. For example, the user GUI may include the media content segment GUI elements 506, 508, and 510 and respective media content segment information 506a, 508a, and 510a. The graphical user interface may be provided for display at the user computing device 102b.

The method 400 may proceed to block 404 where a second version of a first media content segment included in the plurality of media content segments is obtained. In an embodiment, at block 404, the media content administrator using the user computing device 102a may provide, to the content provider computing device 104/300 a new media content segment. In some embodiments, the new media content segment may be unrelated to the other media content segments included in the media content object and be added as an additional media content segment in the media content object. However, in various embodiments, the new media content segment may replace a media content segment that is related or otherwise based on the same topic or identifier as the new media content segment. The new media content segment may be referred to as a subsequent/second version of the initial/first version of the media content segment. For example, the media content segment may be an audio content segment of an audio object. In a specific example, the audio content segment may be a developing news story that is updating over time. As such, the initial/first version of the media content segment may be the initial breaking news of the story, a second version of the media content segment may be an update on the story as it is progressing, a third version of the media content segment may be an additional update of the story, and so on. As described herein, the media content segment remains the same (e.g., a first media content segment) because it is based on a common media content segment identifier or based on a common media content segment. However, the version of the media content segment may change, which indicates a change in the media content included in the media content segment.

The method 400 may proceed to block 406 where the first version of the media content segment is updated to the second version to generate an updated media content object that includes the second version of the media content segment. In an embodiment, at block 406, the content management and versioning controller 304 may update the first version of the media content segment (which may not be the "first" version but may be a previous version that may be a second version or a later version of the initially created version) to the second version of the media content segment. The content management and versioning controller 304 may insert the second version of the media content segment into the media content object replacing the first version of the media content segment such that the media content object includes the second version of the media content segment and, in some embodiments, removes the first version of the media content segment from the media content object. However, in some embodiments the first version may remain in the media content object but will be hidden or not presented to a user unless requested by a user.

In some embodiments, the content management and versioning controller 304 may generate, using the second version of the media content segment, an abridged second version of the media content segment. In some instances, the second version of the media content segment may repeat some of the subject matter or reuse some of the content of the first version of the media content segment. This content may be redundant to a user consuming the media content object. As such, the abridged second version of the media content segment may be generated based on the second version of the media content segment and be included in a third media content object for users that have consumed the first version of the media content segment while the second version of the media content segment may be included in the second media content object that is for consumption by users that have not consumed the first version of the media content segment.

In some embodiments, the media content administrator may generate the abridged second version of the media content segment and provide to the content provider computing device 104/300. However, in other embodiments, the content management and versioning controller 304 may generate the abridged second version of the first audio content segment by removing common content from the second version of the media content segment that is included in the first version of the media content segment. The content management and versioning controller 304 may include a content comparator that compares the media content of the first version to the media content of the second version to identify common content and then generate the abridged second version of the media content segment with the uncommon content. For example, if the media content segment is an audio content segment, the content management and versioning controller 304 may include a speech-to-text converter to convert the speech in the audio content segment versions to text. The content management and versioning controller 304 may also include a text comparator that may determine the differences between the first version and the second version and generate the abridged second version using the differences between the first version and the second version (e.g., removing content from the second version that is found in the first version). In other examples, feature vectors between two versions of a media content segment may be determined and compared to determine a delta between the two versions of the media content segment and create the abridged version using content in the second version that is not in the first version. While specific examples of generating an abridged second version of a media content segment are described, one of skill in the art in possession of the present disclosure will recognize that other media content segment comparisons, which may be based on the type of media content (e.g., audio, video, text) may be performed to determine "new" content in the second version that was not in the first version and use that "new" content in the abridge second version.

Figure 5C:
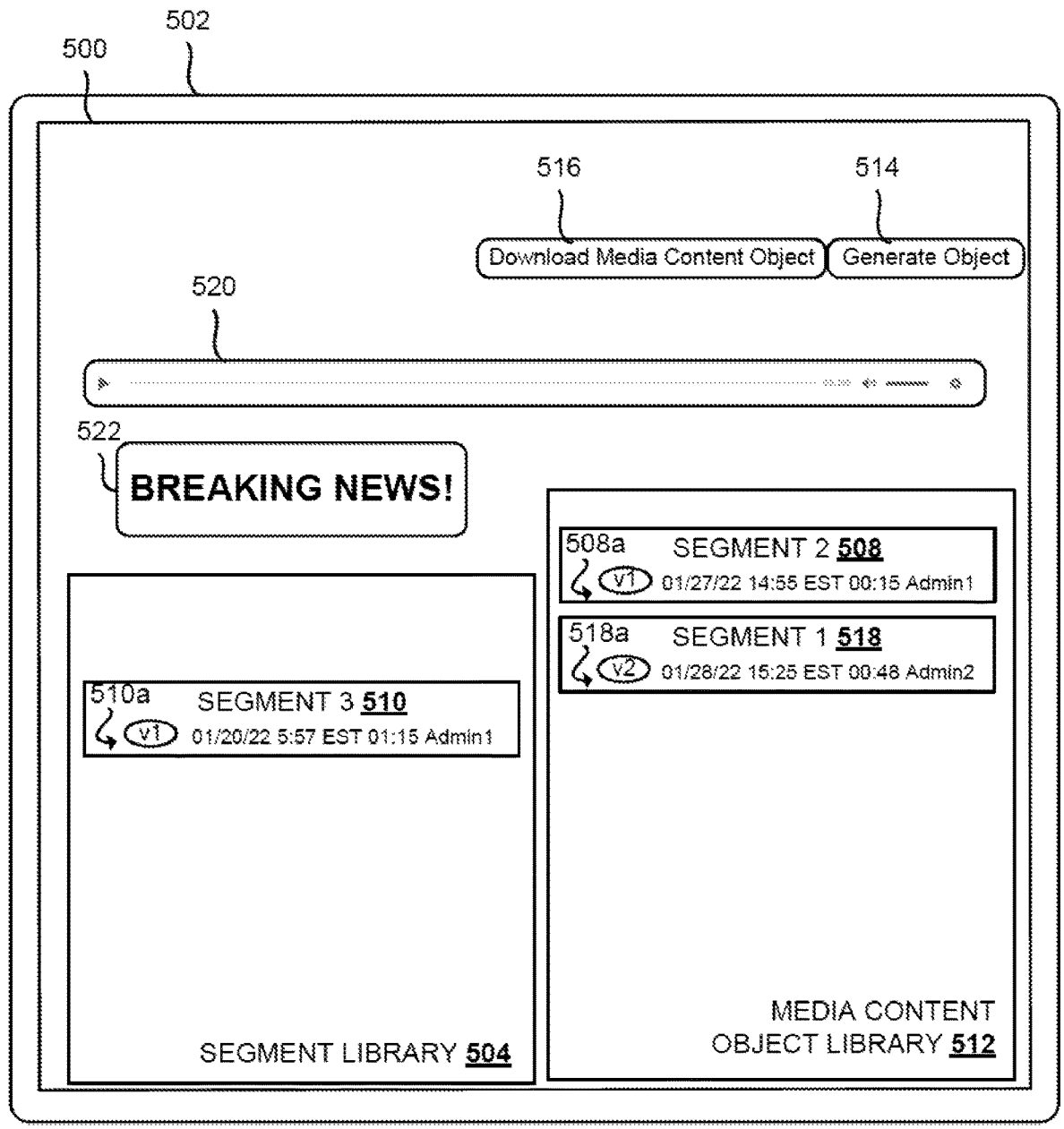
FIG. 5C illustrates a GUI during some embodiments of the method of FIG. 4, in accordance with some embodiments of the present disclosure.

FIG. 5C illustrates an example where the media content segment associated with the media content segment GUI element 506 may be updated to a second version that causes the content management and versioning controller 304 to update all the first version media content segments to the second version of the media content segments. For example, each media content object that includes the media content segments associated with the media content segment GUI element 506 may be updated from the first version to the second version. As such, the media content segment GUI element 506 may be updated to media content segment GUI element 518 that is associated with the second version of the media content object. The media content segment GUI element 518 may include media content segment information 518a such as a version (e.g., "v2") of the media content segment, a version time stamp (e.g., "1/28/22 15:25 EST"), a version duration (e.g., "00:48"), and a version author (e.g., "Admin2").

The method 400 may proceed to block 408 where the second media content object is provided to a user computing device. In an embodiment, at block 408, the content management and versioning controller 304 may provide the second media content object that includes the second version of the media content to the user computing device 102b. For example, the second media content object may be provided via the network 108 upon receiving a request from the user computing device 102b or when a user logs in to the user's user account (e.g., stored in user accounts 308c) associated with the website provided by the content management and versioning controller 304. In various embodiments, the providing the second media content object may include providing an option to the user to consume the second media content object. The user may consume, partially consume (e.g., consume a portion of the segments), or not consume the second media content object. In various embodiments, a user GUI may be generated that corresponds with the second media content object that included the second version of the media content segment. The user GUI may indicate a version history for each media content segment of the second media content object. The user GUI may be provided for display at the user computing device 102b, and the user may use the user GUI to obtain information about the second media content object, the second version of the media content segment, other media content segments, versioning history, or any other information that would be apparent to one of skill in the art in possession of the present disclosure. The user may also use the user GUI to consume the second media content object. For example, an audio player (e.g., the audio player 520 of FIGS. 5A-5C) may be presented through the user GUI that causes audio content included in the second media content object to play via speakers included in the user I/O system 218 of the user computing device 102b As discussed above, in some embodiments, if the user consumed the first version of the media content segment, the content management and versioning controller 304 may provide the third media content object that includes the abridged second version of the media content segment to the user computing device 102b rather than providing the second media content object. For example, the third media content object may be provided via the network 108 upon receiving a request from the user computing device 102b or when the user logs in to the user's user account (e.g., stored in user accounts 308c) associated with the website provided by the content management and versioning controller 304. The content management and versioning controller 304 may detect via a cookie or other user tracking algorithm that the user of the user computing device 102a has consumed the first version of the audio content segment, and in response, select the third media content object that includes the abridged second version of the media content segment. In various embodiments, the providing the third media content object may include providing an option to the user to consume the third media content object. The user may consume, partially consume (e.g., consume a portion of the segments), or not consume the third media content object. In various embodiments, a user GUI may be generated that corresponds with the third media content object that included the abridged second version of the media content segment. The user GUI may indicate a version history for each media content segment of the third media content object. The user GUI may be provided for display at the user computing device 102b, and the user may use the user GUI to obtain information about the third media content object, the abridge second version of the media content segment, other media content segments, and versioning history. The user may also use the user GUI to consume the third media content object.

In various embodiments, when providing an updated media content object that includes a new version of a media content segment that was in a pervious media content object, the version history may be included in the updated media content object. For example, the version history may include version information. The version information may include the media content information discussed above such as, for example, an author of the version, when the version was created, when the version was posted, a version identifier, a description of the changes from a previous version, or any other version information that would be apparent to one of skill in the art in possession of the present disclosure. In some embodiments, the version history may include a version hash that may be provided separate from the media content object such that a user may running a hashing algorithm on the media content object and compare it to the version hash to verify the authenticity or "truthfulness" of the version when the version hash matches the media content object hash.

In various embodiments, when a version of a media content segment is updated, the content management and versioning controller 304 may provide a selectable indicator in the user GUI provided to the user computing device 102b. The selectable indicator may include a button that indicates to a user that a new version is available. For example, a user may elect to receive updates to a news story that the user wants to follow. If there is an update to a news story that the user has been following, a selectable indicator, such as a breaking news button provided by the content management and versioning controller 304, may appear in the user GUI. The content provider computing device 104/300 may receive, from the user computing device 102b, a selection notification of a selection of the first selectable indicator, and provide the second version or abridged second version of the media content segment to the user computing device 102b for consumption. For example, the media content object that includes the second version may be provided and the content management and versioning controller 304 may cause a media player to advance to the second version of the media content segment. In some embodiments, the selectable indicator may appear when a new version of a media content segment is available. As illustrated, in FIG. 5C, a selectable indicator 522 may appear when the media content GUI element 518 is generated indicating a new version of the associated media content object. However, in other embodiments, the selectable indicator may be present in the user GUI when a new version is not available but provided in a different color or being unselectable. In various embodiments, once the media content segment that caused the selectable indicator to be present or selectable is consumed by the user, the selectable indicator may be removed from the GUI, experience a change in color, or otherwise become unselectable.

In various embodiments, previous versions of the media content segment may be available for consumption by the user of the user computing device 102b. For example, the user GUI that provides the second media content object or the third media content object may provide an option for the user to request the first version of the media content segment. The user, via the user computing device 102b, may use the option to request the first version of the media content segment and the content management and versioning controller 304 may provide back to the user computing device 102b the first version of the media content segment that is included in the first media content object. In some embodiments, the first version may also be included in the second media content object or the third media content object but is skipped or otherwise hidden from the user when that media content object is consumed unless the user requests the previous version of the media content object.

Thus, the systems and methods of the present disclosure provide a media content versioning system that may automatically update a media content segment that is included in one or more media content objects when that the version of the media content segment is updated from a first version to a second version. The version history of media content segments may be presented to the user and the new version may be abridged or otherwise augmented based on user preferences or whether the user consumed the previous version of the media content segment. As such, the systems and methods of the present disclosure reduce memory, processing, and network resources by segmenting media content and providing updates to media content objects to only media content segments included in the media content objects that have an updated version. Also, users are better able to determine the history of the media content segment and detect any modifications that may present distorted or false information.

Figure 6:
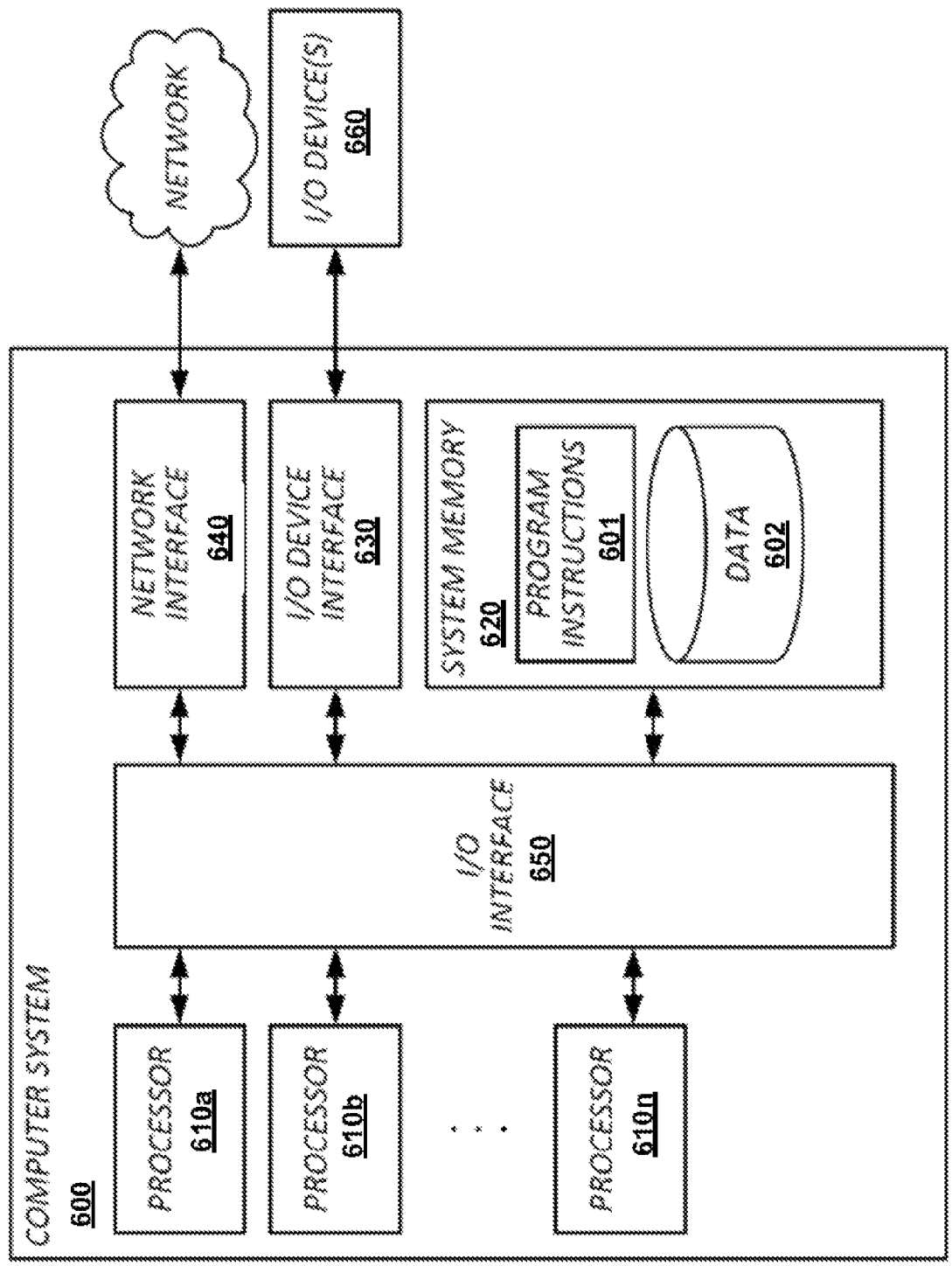
FIG. 6 is a block diagram of an example of a computing system with which the present techniques may be implemented, in accordance with some embodiments of the present disclosure.

FIG. 6 is a diagram that illustrates an exemplary computing system 600 in accordance with embodiments of the present technique. The user computing devices 102a, 102b, and 200 and the content provider computing devices 104 and 300, discussed above, may be provided by the computing system 600. Various portions of systems and methods described herein, may include or be executed on one or more computing systems similar to computing system 600. Further, processes and modules described herein may be executed by one or more processing systems similar to that of computing system 600.

Computing system 600 may include one or more processors (e.g., processors 610a-610n) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 600 may include a plurality of computing devices (e.g., distributed computing systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computing system, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 601 or data 602. Program instructions 601 may be executable by a processor (e.g., one or more of processors 610a-610n) to implement one or more embodiments of the present techniques. Instructions 601 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 650 may be configured to coordinate I/O traffic between processors 610a-1010n, system memory 620, network interface 640, I/O devices 660, or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600 or multiple computing systems 600 configured to host different portions or instances of embodiments. Multiple computing systems 600 may provide for parallel or sequential processing/execution of one or more portions of the techniques described herein.

Those skilled in the art will appreciate that computing system 600 is merely illustrative and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 600 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 600 may be transmitted to computing system 600 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text;

images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: providing, using a computer system, a first audio content object that includes a plurality of audio content segments to a set of user computing devices, wherein each audio content segment of the plurality of audio content segments is associated with a first version of that audio content segment; obtaining, using the computer system, a second version of a first audio content segment included in the plurality of audio content segments; updating, using the computer system, the first version of the first audio content segment to the second version to generate a second audio content object from the first audio content object that includes the second version of the first audio content segment and at least a first version of a second audio content segment included in the plurality of audio content segments; providing, using the computer system, the second audio content object to at least a first portion of the set of user computing devices; and indicating, using the computer system, a version history of the first audio content segment to at least the first portion of the set of user computing devices.
2. The medium of embodiment 1, wherein the operations further comprise: generating, using the computer system, a first graphical user interface that corresponds with the first audio content object and that indicates the version history of the first audio content segment; and providing, using the computer system, the first graphical user interface for display at the at least the first portion of the set of computing devices.
3. The medium of embodiment 1, wherein the at least the first portion of the set of user computing devices are associated with a respective user that has not consumed the first version of the first audio content segment.
4. The medium of embodiment 1, wherein the operations further comprise: generating, using the computer system and the second version of the first audio content segment, an abridged second version of the first audio content segment; updating, using the computer system, the first version of the first audio content segment to the abridged second version to generate a third audio content object that includes the abridged second version of the first audio content segment and at least the first version of the second audio content segment included in the plurality of audio content segments; and providing, using the computer system, the third audio content object to at least a second portion of the set of user computing devices, wherein the at least the second portion of the set of user computing devices are associated with a respective user that has consumed the first version of the first audio content segment.
5. The medium of embodiment 4, wherein the consumption of the first version of the first audio content segment is detected based on user tracking information.
6. The medium of embodiment 5, wherein the user tracking information includes a cookie that indicates that the respective user has consumed the first version.
7. The medium of embodiment 4, wherein the generating the abridged second version of the first audio content segment includes removing common content from the second version of the first audio content segment that is included in the first version of the first audio content segment.
8. The medium of embodiment 4, wherein the operations further comprise: generating, using the computer system, a first graphical user interface that corresponds with the second audio content object and that indicates the version history of the first audio content segment; and providing, using the computer system, the first graphical user interface for display at the at least the first portion of the set of computing devices; generating, using the computer system, a second graphical user interface that corresponds with the third audio content object and that indicates the version history of the first audio content segment; and providing, using the computer system, the second graphical user interface for display at the at least the second portion of the set of computing devices.
9. The medium of embodiment 8, wherein the first graphical user interface includes a first selectable indicator when the first audio content segment is updated from the first version to the second version.
10. The medium of embodiment 9, wherein the operations further comprise: receiving, using the computer system and from a first user computing device included in the at least the first portion of the set of user computing devices, a selection notification of the first selectable indicator; and providing, using the computer system, the second version of the first audio content segment to the first user computing device for audio consumption.
11. The medium of embodiment 8, wherein the second graphical user interface includes a second selectable indicator when the first audio content segment is updated from the first version to the abridged second version.
12. The medium of embodiment 11, wherein the operations further comprise: receiving, using the computer system and from a user computing device included in the at least the second portion of the set of user computing devices, a selection notification of the second selectable indicator; and providing, using the computer system, the abridged second version of the third audio content segment to the user computing device for audio consumption.

13. The medium of embodiment 12, wherein the second selectable indicator is displayed but unselectable subsequent to the abridged second version of the third audio content segment being consumed.
14. The medium of embodiment 1, wherein the operations further comprise: receiving, using the computer system, a request for the first version of the first audio content segment from a computing device of the set of computing devices; and providing, using the computer system, the first version of the first audio content segment.
15. The medium of embodiment 1, wherein the operations further comprise: generating, using the computer system, a fourth audio content object from a third audio content object that includes the first version of the first audio content segment when the first version of the first audio content segment is updated to the second version of the first audio content segment, wherein the fourth audio content object includes the second version of the first audio content segment when generated.
16. The medium of embodiment 1, wherein the operations further comprise: generating, using the computer system, the second version of the first audio content segment and user preferences, an augmented second version of the first audio content segment; updating, using the computer system, the first version of the first audio content segment to the augmented second version to generate a third audio content object that includes the augmented second version of the first audio content segment and at least the first version of the second audio content segment included in the plurality of audio content segments; and providing, using the computer system, the third audio content object to at least a second portion of the set of user computing devices, wherein the at least the second portion of the set of user computing devices are associated with a respective user that that is associated with the user preferences.
17. The medium of embodiment 1, wherein the operations further comprise steps for generating the first audio content object from the plurality of audio content segments.
18. The medium of embodiment 1, wherein the operations further comprise steps for indicating the version history to a user.
19. A method, comprising: providing, using a computer system, a first media content object that includes a plurality of media segments to a set of user computing devices, wherein each media segment of the plurality of media segments is associated with a first version of that media segment; obtaining, using the computer system, a second version of a first media segment included in the plurality of media segments; updating, using the computer system, the first version of the first media segment to the second version to generate a second media content object from the first media content object that includes the second version of the first media segment and at least a first version of a second media segment included in the plurality of media segments; providing, using the computer system, the second media content object to at least a first portion of the set of user computing devices; and indicating, using the computer system, a version history of the first media segment to at least the first portion of the set of user computing devices.
20. The method of embodiment 19, wherein the first media content object and the second media content object include at least one of an audio content object, a video content object, an audiovisual content object, a text content object, a picture content object, or a haptic content object.

What is claimed is:

1. A non-transitory, machine-readable medium storing instructions that, when executed by one or more processors, effectuate operations comprising:
   providing, using a computer system, a first audio content object that includes a plurality of audio content segments to a set of user computing devices, wherein each audio content segment of the plurality of audio content segments is associated with a first version of that audio content segment;
   obtaining, using the computer system, a second version of a first audio content segment included in the plurality of audio content segments;
   updating, using the computer system, the first version of the first audio content segment to the second version to generate a second audio content object from the first audio content object that includes the second version of the first audio content segment and at least a first version of a second audio content segment included in the plurality of audio content segments;
   providing, using the computer system, the second audio content object to at least a first portion of the set of user computing devices;
   generating, using the computer system and the second version of the first audio content segment, an abridged second version of the first audio content segment;
   updating, using the computer system, the first version of the first audio content segment to the abridged second version to generate a third audio content object that includes the abridged second version of the first audio content segment and at least the first version of the second audio content segment included in the plurality of audio content segments; and
   providing, using the computer system, the third audio content object to at least a second portion of the set of user computing devices, wherein the at least the second portion of the set of user computing devices are associated with a respective user that has consumed the first version of the first audio content segment.

2. The medium of claim 1, wherein the operations further comprise:
   indicating, using the computer system, a version history of the first audio content segment to at least the first portion of the set of user computing devices.

3. The medium of claim 2, wherein the operations further comprise:
   generating, using the computer system, a first graphical user interface that corresponds with the first audio content object and that indicates the version history of the first audio content segment; and
   providing, using the computer system, the first graphical user interface for display at the at least the first portion of the set of user computing devices.

4. The medium of claim 2, wherein the operations further comprise steps for indicating the version history to a user.

5. The medium of claim 1, wherein the at least the first portion of the set of user computing devices are associated with a respective user that has not consumed the first version of the first audio content segment.

6. The medium of claim 1, wherein the consumption of the first version of the first audio content segment is detected based on user tracking information.

7. The medium of claim 6, wherein the user tracking information includes a cookie that indicates that the respective user has consumed the first version.

8. The medium of claim 1, wherein the generating the abridged second version of the first audio content segment includes removing common content from the second version of the first audio content segment that is included in the first version of the first audio content segment.

9. The medium of claim 1, wherein the operations further comprise:
generating, using the computer system, a first graphical user interface that corresponds with the second audio content object and that indicates a version history of the first audio content segment;
providing, using the computer system, the first graphical user interface for display at the at least the first portion of the set of user computing devices;
generating, using the computer system, a second graphical user interface that corresponds with the third audio content object and that indicates the version history of the first audio content segment; and
providing, using the computer system, the second graphical user interface for display at the at least the second portion of the set of user computing devices.

10. The medium of claim 9, wherein the first graphical user interface includes a first selectable indicator when the first audio content segment is updated from the first version to the second version.

11. The medium of claim 10, wherein the operations further comprise:
receiving, using the computer system and from a first user computing device included in the at least the first portion of the set of user computing devices, a selection notification of the first selectable indicator; and
providing, using the computer system, the second version of the first audio content segment to the first user computing device for audio consumption.

12. The medium of claim 9, wherein the second graphical user interface includes a second selectable indicator when the first audio content segment is updated from the first version to the abridged second version.

13. The medium of claim 12, wherein the operations further comprise:
receiving, using the computer system and from a user computing device included in the at least the second portion of the set of user computing devices, a selection notification of the second selectable indicator; and
providing, using the computer system, the abridged second version of the third audio content object to the user computing device for audio consumption.

14. The medium of claim 13, wherein the second selectable indicator is displayed but unselectable subsequent to the abridged second version of the third audio content object being consumed.

15. The medium of claim 1, wherein the operations further comprise:
receiving, using the computer system, a request for the first version of the first audio content segment from a user computing device of the set of user computing devices; and
providing, using the computer system, the first version of the first audio content segment.

16. The medium of claim 1, wherein the operations further comprise:
generating, using the computer system, a fifth audio content object from a fourth audio content object that includes the first version of the first audio content segment when the first version of the first audio content segment is updated to the second version of the first audio content segment, wherein the fifth audio content object includes the second version of the first audio content segment when generated.

17. The medium of claim 1, wherein the operations further comprise:
generating, using the computer system, the second version of the first audio content segment and user preferences, an augmented second version of the first audio content segment;
updating, using the computer system, the first version of the first audio content segment to the augmented second version to generate a fourth audio content object that includes the augmented second version of the first audio content segment and at least the first version of the second audio content segment included in the plurality of audio content segments; and
providing, using the computer system, the fourth audio content object to at least a second portion of the set of user computing devices, wherein the at least the second portion of the set of user computing devices are associated with a respective user that is associated with the user preferences.

18. The medium of claim 1, wherein the operations further comprise steps for generating the first audio content object from the plurality of audio content segments.

19. A method, comprising:
providing, using a computer system, a first audio content object that includes a plurality of audio content segments to a set of user computing devices, wherein each audio content segment of the plurality of audio content segments is associated with a first version of that audio content segment;
obtaining, using the computer system, a second version of a first audio content segment included in the plurality of audio content segments;
updating, using the computer system, the first version of the first audio content segment to the second version to generate a second audio content object from the first audio content object that includes the second version of the first audio content segment and at least a first version of a second audio content segment included in the plurality of audio content segments;
providing, using the computer system, the second audio content object to at least a first portion of the set of user computing devices;
generating, using the computer system and the second version of the first audio content segment, an abridged second version of the first audio content segment
updating, using the computer system, the first version of the first audio content segment to the abridged second version to generate a third audio content object that includes the abridged second version of the first audio content segment and at least the first version of the second audio content segment included in the plurality of audio content segments; and
providing, using the computer system, the third audio content object to at least a second portion of the set of user computing devices, wherein the at least the second portion of the set of user computing devices are associated with a respective user that has consumed the first version of the first audio content segment.

20. The method of claim 19, further comprising:
indicating, using the computer system, a version history of the first audio content segment to at least the first portion of the set of user computing devices.

21. The method of claim 20, further comprising:
generating, using the computer system, a first graphical user interface that corresponds with the first audio content object and that indicates the version history of the first audio content segment; and
providing, using the computer system, the first graphical user interface for display at the at least the first portion of the set of user computing devices.

22. The method of claim 20, further comprising steps for indicating the version history to a user.

23. The method of claim 19, wherein the at least the first portion of the set of user computing devices are associated with a respective user that has not consumed the first version of the first audio content segment.

24. The method of claim 19, wherein the consumption of the first version of the first audio content segment is detected based on user tracking information.

25. The method of claim 24, wherein the user tracking information includes a cookie that indicates that the respective user has consumed the first version.

26. The method of claim 19, wherein the generating the abridged second version of the first audio content segment includes removing common content from the second version of the first audio content segment that is included in the first version of the first audio content segment.

27. The method of claim 19, further comprising:
generating, using the computer system, a first graphical user interface that corresponds with the second audio content object and that indicates a version history of the first audio content segment;
providing, using the computer system, the first graphical user interface for display at the at least the first portion of the set of user computing devices;
generating, using the computer system, a second graphical user interface that corresponds with the third audio content object and that indicates the version history of the first audio content segment; and
providing, using the computer system, the second graphical user interface for display at the at least the second portion of the set of user computing devices.

28. The method of claim 27, wherein the first graphical user interface includes a first selectable indicator when the first audio content segment is updated from the first version to the second version.

29. The method of claim 28, further comprising:
receiving, using the computer system and from a first user computing device included in the at least the first portion of the set of user computing devices, a selection notification of the first selectable indicator; and
providing, using the computer system, the second version of the first audio content segment to the first user computing device for audio consumption.

30. The method of claim 27, wherein the second graphical user interface includes a second selectable indicator when the first audio content segment is updated from the first version to the abridged second version.

31. The method of claim 30, further comprising:
receiving, using the computer system and from a user computing device included in the at least the second portion of the set of user computing devices, a selection notification of the second selectable indicator; and
providing, using the computer system, the abridged second version of the third audio content object to the user computing device for audio consumption.

32. The method of claim 31, wherein the second selectable indicator is displayed but unselectable subsequent to the abridged second version of the third audio content object being consumed.

33. The method of claim 19, further comprising:
receiving, using the computer system, a request for the first version of the first audio content segment from a user computing device of the set of user computing devices; and
providing, using the computer system, the first version of the first audio content segment.

34. The method of claim 19, further comprising:
generating, using the computer system, a fifth audio content object from a fourth audio content object that includes the first version of the first audio content segment when the first version of the first audio content segment is updated to the second version of the first audio content segment, wherein the fifth audio content object includes the second version of the first audio content segment when generated.

35. The method of claim 19, further comprising:
generating, using the computer system, the second version of the first audio content segment and user preferences, an augmented second version of the first audio content segment;
updating, using the computer system, the first version of the first audio content segment to the augmented second version to generate a fourth audio content object that includes the augmented second version of the first audio content segment and at least the first version of the second audio content segment included in the plurality of audio content segments; and
providing, using the computer system, the fourth audio content object to at least a second portion of the set of user computing devices, wherein the at least the second portion of the set of user computing devices are associated with a respective user that that is associated with the user preferences.

36. The method of claim 19, further comprising steps for generating the first audio content object from the plurality of audio content segments.

37. A non-transitory, machine-readable medium storing instructions that, when executed by one or more processors, effectuate operations comprising:
providing, using a computer system, a first audio content object that includes a plurality of audio content segments to a set of user computing devices, wherein each audio content segment of the plurality of audio content segments is associated with a first version of that audio content segment;
obtaining, using the computer system, a second version of a first audio content segment included in the plurality of audio content segments;
updating, using the computer system, the first version of the first audio content segment to the second version to generate a second audio content object from the first audio content object that includes the second version of the first audio content segment and at least a first version of a second audio content segment included in the plurality of audio content segments;
providing, using the computer system, the second audio content object to at least a first portion of the set of user computing devices; and
generating, using the computer system, a fourth audio content object from a third audio content object that includes the first version of the first audio content segment when the first version of the first audio content segment is updated to the second version of the first audio content segment, wherein the fourth audio content object includes the second version of the first audio content segment when generated.

38. The medium of claim 37, wherein the operations further comprise:
indicating, using the computer system, a version history of the first audio content segment to at least the first portion of the set of user computing devices.

39. The medium of claim 38, wherein the operations further comprise:
generating, using the computer system, a first graphical user interface that corresponds with the first audio content object and that indicates the version history of the first audio content segment; and
providing, using the computer system, the first graphical user interface for display at the at least the first portion of the set of user computing devices.

40. The medium of claim 38, wherein the operations further comprise steps for indicating the version history to a user.

41. The medium of claim 37, wherein the at least the first portion of the set of user computing devices are associated with a respective user that has not consumed the first version of the first audio content segment.

42. The medium of claim 37, wherein the operations further comprise:
generating, using the computer system and the second version of the first audio content segment, an abridged second version of the first audio content segment;
updating, using the computer system, the first version of the first audio content segment to the abridged second version to generate a fifth audio content object that includes the abridged second version of the first audio content segment and at least the first version of the second audio content segment included in the plurality of audio content segments; and
providing, using the computer system, the fifth audio content object to at least a second portion of the set of user computing devices, wherein the at least the second portion of the set of user computing devices are associated with a respective user that has consumed the first version of the first audio content segment.

43. The medium of claim 42, wherein the consumption of the first version of the first audio content segment is detected based on user tracking information.

44. The medium of claim 43, wherein the user tracking information includes a cookie that indicates that the respective user has consumed the first version.

45. The medium of claim 42 wherein the generating the abridged second version of the first audio content segment includes removing common content from the second version of the first audio content segment that is included in the first version of the first audio content segment.

46. The medium of claim 42, wherein the operations further comprise:
generating, using the computer system, a first graphical user interface that corresponds with the second audio content object and that indicates a version history of the first audio content segment;
providing, using the computer system, the first graphical user interface for display at the at least the first portion of the set of user computing devices;
generating, using the computer system, a second graphical user interface that corresponds with the fifth audio content object and that indicates the version history of the first audio content segment; and providing, using the computer system, the second graphical user interface for display at the at least the second portion of the set of user computing devices.

47. The medium of claim 46, wherein the first graphical user interface includes a first selectable indicator when the first audio content segment is updated from the first version to the second version.

48. The medium of claim 47, wherein the operations further comprise:
receiving, using the computer system and from a first user computing device included in the at least the first portion of the set of user computing devices, a selection notification of the first selectable indicator; and
providing, using the computer system, the second version of the first audio content segment to the first user computing device for audio consumption.

49. The medium of claim 46, wherein the second graphical user interface includes a second selectable indicator when the first audio content segment is updated from the first version to the abridged second version.

50. The medium of claim 49, wherein the operations further comprise:
receiving, using the computer system and from a user computing device included in the at least the second portion of the set of user computing devices, a selection notification of the second selectable indicator; and
providing, using the computer system, the abridged second version of the fifth audio content object to the user computing device for audio consumption.

51. The medium of claim 50, wherein the second selectable indicator is displayed but unselectable subsequent to the abridged second version of the fifth audio content object being consumed.

52. The medium of claim 37, wherein the operations further comprise:
receiving, using the computer system, a request for the first version of the first audio content segment from a user computing device of the set of user computing devices; and
providing, using the computer system, the first version of the first audio content segment.

53. The medium of claim 37, wherein the operations further comprise:
generating, using the computer system, the second version of the first audio content segment and user preferences, an augmented second version of the first audio content segment;
updating, using the computer system, the first version of the first audio content segment to the augmented second version to generate a fifth audio content object that includes the augmented second version of the first audio content segment and at least the first version of the second audio content segment included in the plurality of audio content segments; and
providing, using the computer system, the fifth audio content object to at least a second portion of the set of user computing devices, wherein the at least the second portion of the set of user computing devices are associated with a respective user that that is associated with the user preferences.

54. The medium of claim 37, wherein the operations further comprise steps for generating the first audio content object from the plurality of audio content segments.

55. A method, comprising:
providing, using a computer system, a first audio content object that includes a plurality of audio content segments to a set of user computing devices, wherein each audio content segment of the plurality of audio content segments is associated with a first version of that audio content segment;

obtaining, using the computer system, a second version of a first audio content segment included in the plurality of audio content segments;

updating, using the computer system, the first version of the first audio content segment to the second version to generate a second audio content object from the first audio content object that includes the second version of the first audio content segment and at least a first version of a second audio content segment included in the plurality of audio content segments;

providing, using the computer system, the second audio content object to at least a first portion of the set of user computing devices; and generating, using the computer system, a fourth audio content object from a third audio content object that includes the first version of the first audio content segment when the first version of the first audio content segment is updated to the second version of the first audio content segment, wherein the fourth audio content object includes the second version of the first audio content segment when generated.

56. The method of claim 55, further comprising:
indicating, using the computer system, a version history of the first audio content segment to at least the first portion of the set of user computing devices.

57. The method of claim 56, further comprising:
generating, using the computer system, a first graphical user interface that corresponds with the first audio content object and that indicates the version history of the first audio content segment; and
providing, using the computer system, the first graphical user interface for display at the at least the first portion of the set of user computing devices.

58. The method of claim 56, further comprising steps for indicating the version history to a user.

59. The method of claim 55, wherein the at least the first portion of the set of user computing devices are associated with a respective user that has not consumed the first version of the first audio content segment.

60. The method of claim 55, further comprising:
generating, using the computer system and the second version of the first audio content segment, an abridged second version of the first audio content segment;
updating, using the computer system, the first version of the first audio content segment to the abridged second version to generate a fifth audio content object that includes the abridged second version of the first audio content segment and at least the first version of the second audio content segment included in the plurality of audio content segments; and
providing, using the computer system, the fifth audio content object to at least a second portion of the set of user computing devices, wherein the at least the second portion of the set of user computing devices are associated with a respective user that has consumed the first version of the first audio content segment.

61. The method of claim 60, wherein the consumption of the first version of the first audio content segment is detected based on user tracking information.

62. The method of claim 61, wherein the user tracking information includes a cookie that indicates that the respective user has consumed the first version.

63. The method of claim 60 wherein the generating the abridged second version of the first audio content segment includes removing common content from the second version of the first audio content segment that is included in the first version of the first audio content segment.

64. The method of claim 60, further comprising:
generating, using the computer system, a first graphical user interface that corresponds with the second audio content object and that indicates a version history of the first audio content segment;
providing, using the computer system, the first graphical user interface for display at the at least the first portion of the set of user computing devices;
generating, using the computer system, a second graphical user interface that corresponds with the fifth audio content object and that indicates the version history of the first audio content segment; and
providing, using the computer system, the second graphical user interface for display at the at least the second portion of the set of user computing devices.

65. The method of claim 64, wherein the first graphical user interface includes a first selectable indicator when the first audio content segment is updated from the first version to the second version.

66. The method of claim 65, further comprising:
receiving, using the computer system and from a first user computing device included in the at least the first portion of the set of user computing devices, a selection notification of the first selectable indicator; and
providing, using the computer system, the second version of the first audio content segment to the first user computing device for audio consumption.

67. The method of claim 64, wherein the second graphical user interface includes a second selectable indicator when the first audio content segment is updated from the first version to the abridged second version.

68. The method of claim 67, further comprising:
receiving, using the computer system and from a user computing device included in the at least the second portion of the set of user computing devices, a selection notification of the second selectable indicator; and
providing, using the computer system, the abridged second version of the fifth audio content object to the user computing device for audio consumption.

69. The method of claim 68, wherein the second selectable indicator is displayed but unselectable subsequent to the abridged second version of the fifth audio content object being consumed.

70. The method of claim 55, further comprising:
receiving, using the computer system, a request for the first version of the first audio content segment from a user computing device of the set of user computing devices; and
providing, using the computer system, the first version of the first audio content segment.

71. The method of claim 55, further comprising:
generating, using the computer system, the second version of the first audio content segment and user preferences, an augmented second version of the first audio content segment;
updating, using the computer system, the first version of the first audio content segment to the augmented second version to generate a fifth audio content object that includes the augmented second version of the first audio content segment and at least the first version of the second audio content segment included in the plurality of audio content segments; and
providing, using the computer system, the fifth audio content object to at least a second portion of the set of user computing devices, wherein the at least the second portion of the set of user computing devices are associated with a respective user that that is associated with the user preferences.

72. The method of claim 55, further comprising steps for generating the first audio content object from the plurality of audio content segments.

73. A non-transitory, machine-readable medium storing instructions that, when executed by one or more processors, effectuate operations comprising:
providing, using a computer system, a first audio content object that includes a plurality of audio content segments to a set of user computing devices, wherein each audio content segment of the plurality of audio content segments is associated with a first version of that audio content segment;
obtaining, using the computer system, a second version of a first audio content segment included in the plurality of audio content segments;
updating, using the computer system, the first version of the first audio content segment to the second version to generate a second audio content object from the first audio content object that includes the second version of the first audio content segment and at least a first version of a second audio content segment included in the plurality of audio content segments;
providing, using the computer system, the second audio content object to at least a first portion of the set of user computing devices;
generating, using the computer system, the second version of the first audio content segment and user preferences, an augmented second version of the first audio content segment;
updating, using the computer system, the first version of the first audio content segment to the augmented second version to generate a third audio content object that includes the augmented second version of the first audio content segment and at least the first version of the second audio content segment included in the plurality of audio content segments; and
providing, using the computer system, the third audio content object to at least a second portion of the set of user computing devices, wherein the at least the second portion of the set of user computing devices are associated with a respective user that that is associated with the user preferences.

74. The medium of claim 73, wherein the operations further comprise:
indicating, using the computer system, a version history of the first audio content segment to at least the first portion of the set of user computing devices.

75. The medium of claim 74, wherein the operations further comprise:
generating, using the computer system, a first graphical user interface that corresponds with the first audio content object and that indicates the version history of the first audio content segment; and
providing, using the computer system, the first graphical user interface for display at the at least the first portion of the set of user computing devices.

76. The medium of claim 74, wherein the operations further comprise steps for indicating the version history to a user.

77. The medium of claim 73, wherein the at least the first portion of the set of user computing devices are associated with a respective user that has not consumed the first version of the first audio content segment.

78. The medium of claim 73, wherein the operations further comprise:
generating, using the computer system and the second version of the first audio content segment, an abridged second version of the first audio content segment;
updating, using the computer system, the first version of the first audio content segment to the abridged second version to generate a fourth audio content object that includes the abridged second version of the first audio content segment and at least the first version of the second audio content segment included in the plurality of audio content segments; and
providing, using the computer system, the fourth audio content object to at least a second portion of the set of user computing devices, wherein the at least the second portion of the set of user computing devices are associated with a respective user that has consumed the first version of the first audio content segment.

79. The medium of claim 78, wherein the consumption of the first version of the first audio content segment is detected based on user tracking information.

80. The medium of claim 79, wherein the user tracking information includes a cookie that indicates that the respective user has consumed the first version.

81. The medium of claim 78 wherein the generating the abridged second version of the first audio content segment includes removing common content from the second version of the first audio content segment that is included in the first version of the first audio content segment.

82. The medium of claim 78, wherein the operations further comprise:
generating, using the computer system, a first graphical user interface that corresponds with the second audio content object and that indicates a version history of the first audio content segment;
providing, using the computer system, the first graphical user interface for display at the at least the first portion of the set of user computing devices;
generating, using the computer system, a second graphical user interface that corresponds with the fourth audio content object and that indicates the version history of the first audio content segment; and
providing, using the computer system, the second graphical user interface for display at the at least the second portion of the set of user computing devices.

83. The medium of claim 82, wherein the first graphical user interface includes a first selectable indicator when the first audio content segment is updated from the first version to the second version.

84. The medium of claim 83, wherein the operations further comprise:
receiving, using the computer system and from a first user computing device included in the at least the first portion of the set of user computing devices, a selection notification of the first selectable indicator; and
providing, using the computer system, the second version of the first audio content segment to the first user computing device for audio consumption.

85. The medium of claim 82, wherein the second graphical user interface includes a second selectable indicator when the first audio content segment is updated from the first version to the abridged second version.

86. The medium of claim 85, wherein the operations further comprise:
receiving, using the computer system and from a user computing device included in the at least the second portion of the set of user computing devices, a selection notification of the second selectable indicator; and providing, using the computer system, the abridged second version of the fourth audio content object to the user computing device for audio consumption.

87. The medium of claim 86, wherein the second selectable indicator is displayed but unselectable subsequent to the abridged second version of the fourth audio content object being consumed.

88. The medium of claim 73, wherein the operations further comprise:
receiving, using the computer system, a request for the first version of the first audio content segment from a user computing device of the set of user computing devices; and
providing, using the computer system, the first version of the first audio content segment.

89. The medium of claim 73, wherein the operations further comprise:
generating, using the computer system, a fifth audio content object from a fourth audio content object that includes the first version of the first audio content segment when the first version of the first audio content segment is updated to the second version of the first audio content segment, wherein the fifth audio content object includes the second version of the first audio content segment when generated.

90. The medium of claim 73, wherein the operations further comprise steps for generating the first audio content object from the plurality of audio content segments.

91. A method, comprising:
providing, using a computer system, a first audio content object that includes a plurality of audio content segments to a set of user computing devices, wherein each audio content segment of the plurality of audio content segments is associated with a first version of that audio content segment;
obtaining, using the computer system, a second version of a first audio content segment included in the plurality of audio content segments;
updating, using the computer system, the first version of the first audio content segment to the second version to generate a second audio content object from the first audio content object that includes the second version of the first audio content segment and at least a first version of a second audio content segment included in the plurality of audio content segments;
providing, using the computer system, the second audio content object to at least a first portion of the set of user computing devices;
generating, using the computer system, the second version of the first audio content segment and user preferences, an augmented second version of the first audio content segment;
updating, using the computer system, the first version of the first audio content segment to the augmented second version to generate a third audio content object that includes the augmented second version of the first audio content segment and at least the first version of the second audio content segment included in the plurality of audio content segments; and
providing, using the computer system, the third audio content object to at least a second portion of the set of user computing devices, wherein the at least the second portion of the set of user computing devices are associated with a respective user that that is associated with the user preferences.

92. The method of claim 91, further comprising:
indicating, using the computer system, a version history of the first audio content segment to at least the first portion of the set of user computing devices.

93. The method of claim 92, further comprising:
generating, using the computer system, a first graphical user interface that corresponds with the first audio content object and that indicates the version history of the first audio content segment; and
providing, using the computer system, the first graphical user interface for display at the at least the first portion of the set of user computing devices.

94. The method of claim 92, further comprising steps for indicating the version history to a user.

95. The method of claim 91, wherein the at least the first portion of the set of user computing devices are associated with a respective user that has not consumed the first version of the first audio content segment.

96. The method of claim 91, further comprising:
generating, using the computer system and the second version of the first audio content segment, an abridged second version of the first audio content segment;
updating, using the computer system, the first version of the first audio content segment to the abridged second version to generate a fourth audio content object that includes the abridged second version of the first audio content segment and at least the first version of the second audio content segment included in the plurality of audio content segments; and
providing, using the computer system, the fourth audio content object to at least a second portion of the set of user computing devices, wherein the at least the second portion of the set of user computing devices are associated with a respective user that has consumed the first version of the first audio content segment.

97. The method of claim 96, wherein the consumption of the first version of the first audio content segment is detected based on user tracking information.

98. The method of claim 96 wherein the generating the abridged second version of the first audio content segment includes removing common content from the second version of the first audio content segment that is included in the first version of the first audio content segment.

99. The method of claim 96, further comprising:
generating, using the computer system, a first graphical user interface that corresponds with the second audio content object and that indicates a version history of the first audio content segment;
providing, using the computer system, the first graphical user interface for display at the at least the first portion of the set of user computing devices;
generating, using the computer system, a second graphical user interface that corresponds with the fourth audio content object and that indicates the version history of the first audio content segment; and
providing, using the computer system, the second graphical user interface for display at the at least the second portion of the set of user computing devices.

100. The method of claim 99, wherein the first graphical user interface includes a first selectable indicator when the first audio content segment is updated from the first version to the second version.

101. The method of claim 100, further comprising:
receiving, using the computer system and from a first user computing device included in the at least the first portion of the set of user computing devices, a selection notification of the first selectable indicator; and providing, using the computer system, the second version of the first audio content segment to the first user computing device for audio consumption.

102. The method of claim 96, wherein the user tracking information includes a cookie that indicates that the respective user has consumed the first version.

103. The method of claim 99, wherein the second graphical user interface includes a second selectable indicator when the first audio content segment is updated from the first version to the abridged second version.

104. The method of claim 103, further comprising:
receiving, using the computer system and from a user computing device included in the at least the second portion of the set of user computing devices, a selection notification of the second selectable indicator; and
providing, using the computer system, the abridged second version of the fourth audio content object to the user computing device for audio consumption.

105. The method of claim 104, wherein the second selectable indicator is displayed but unselectable subsequent to the abridged second version of the fourth audio content object being consumed.

106. The method of claim 91, further comprising:
receiving, using the computer system, a request for the first version of the first audio content segment from a user computing device of the set of user computing devices; and
providing, using the computer system, the first version of the first audio content segment.

107. The method of claim 91, further comprising:
generating, using the computer system, a fifth audio content object from a fourth audio content object that includes the first version of the first audio content segment when the first version of the first audio content segment is updated to the second version of the first audio content segment, wherein the fifth audio content object includes the second version of the first audio content segment when generated.

108. The method of claim 91, further comprising steps for generating the first audio content object from the plurality of audio content segments.

\* \* \* \* \*